G. SCHLATTER.
TILTING AUTOTRUCK.
APPLICATION FILED SEPT. 19, 1912.
1,071,265.
Patented Aug. 26, 1913.
5 SHEETS—SHEET 1.
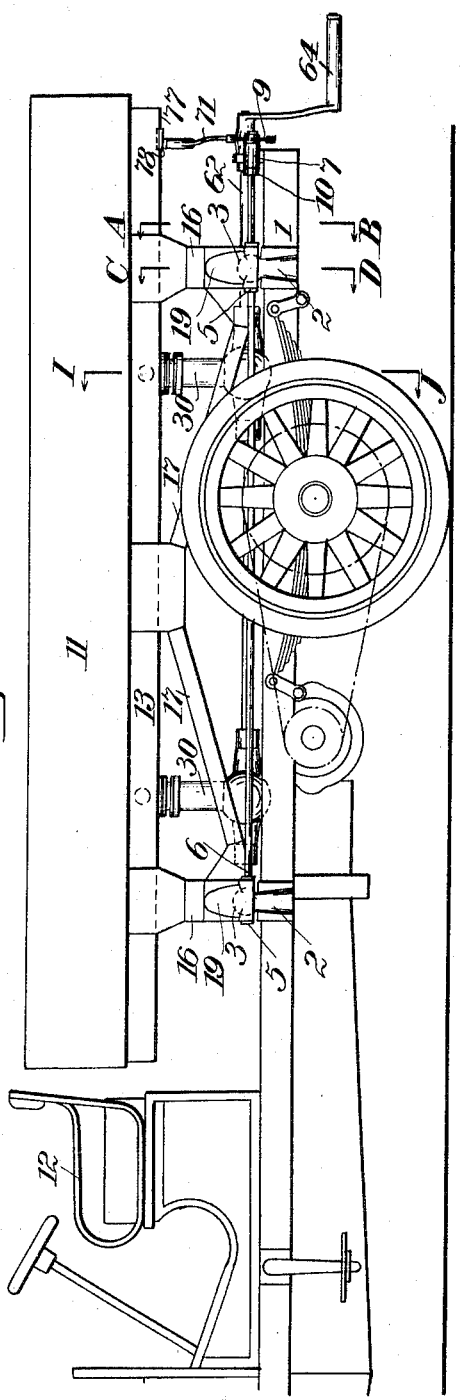
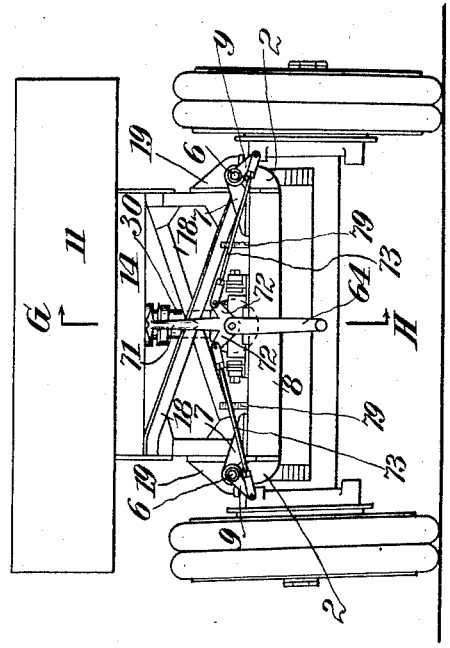
WITNESSES:
John C. Sanders
Albert F. Heuman
INVENTOR:
Gustav Schlatter
BY
ATT'Y.

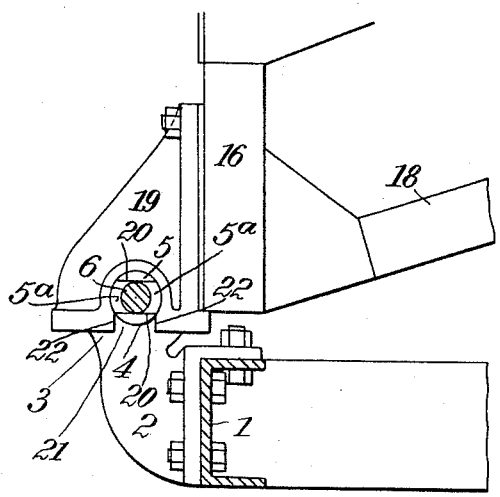
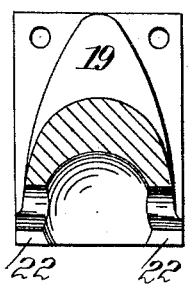
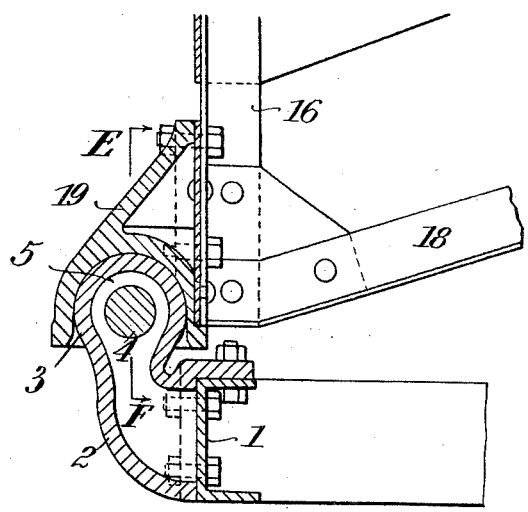

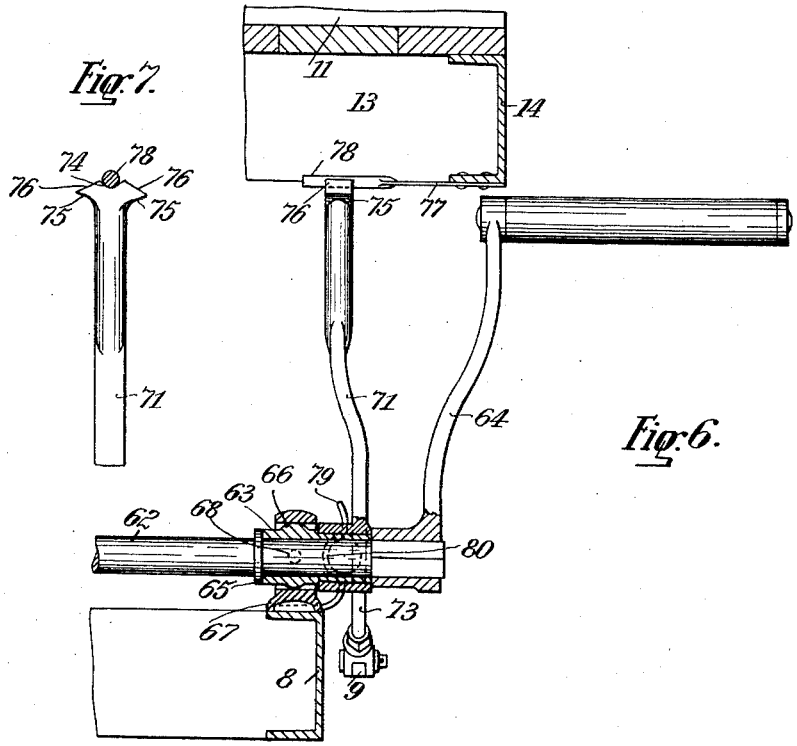
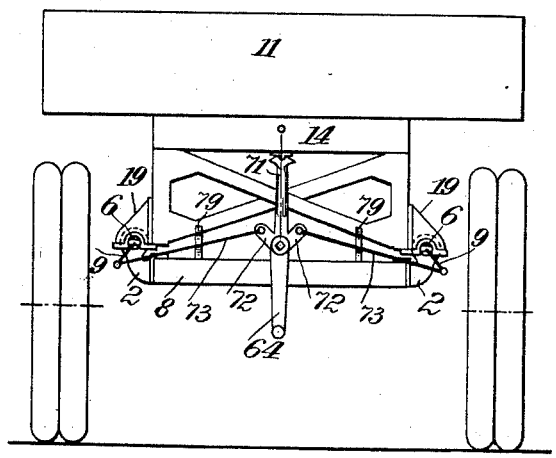

G. SCHLATTER.
TILTING AUTOTRUCK.
APPLICATION FILED SEPT. 19, 1912.
1,071,265.
Patented Aug. 26, 1913.
5 SHEETS—SHEET 4.
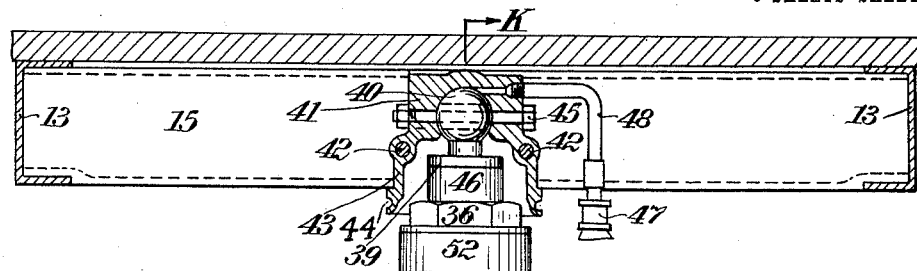
Fig. 8.
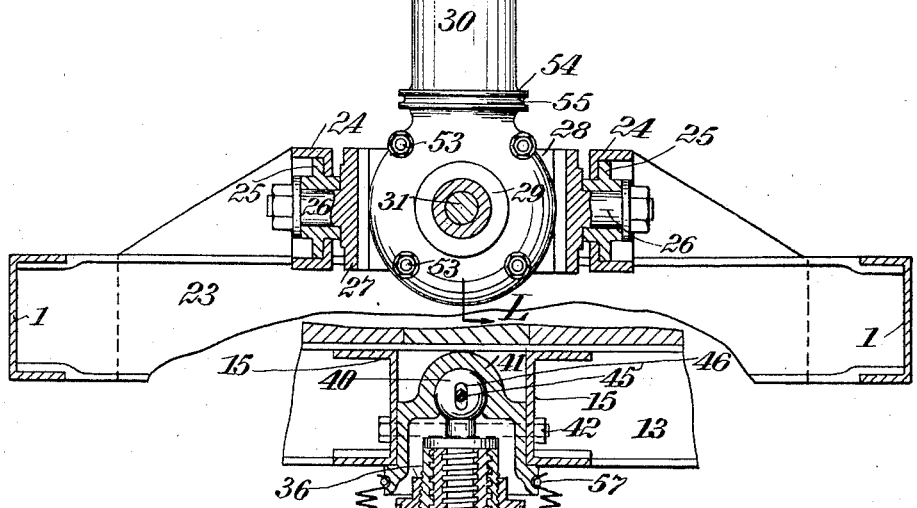
Fig. 9.
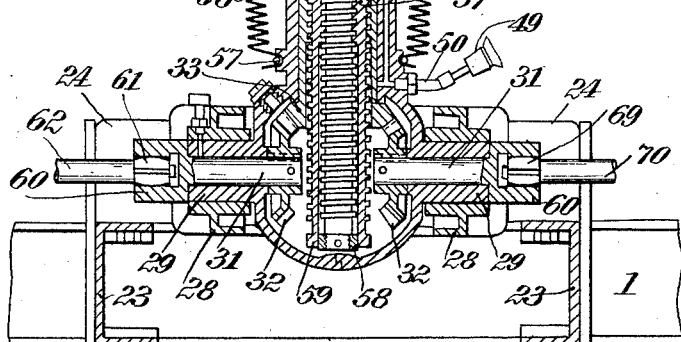
WITNESSES:
John C. Sanders
Albert F. Heuman
INVENTOR:
Gustav Schlatter
By M. Millan Ulih
ATTY.

G. SCHLATTER.
TILTING AUTOTRUCK.
APPLICATION FILED SEPT. 19, 1912.

1,071,265.

Patented Aug. 26, 1913.

5 SHEETS—SHEET 5.

UNITED STATES PATENT OFFICE.

GUSTAV SCHLATTER, OF ARBON, SWITZERLAND.

TILTING AUTOTRUCK.

1,071,265.    Specification of Letters Patent.    Patented Aug. 26, 1913.

Application filed September 19, 1912. Serial No. 721,131.

*To all whom it may concern:*

Be it known that I, GUSTAV SCHLATTER, a citizen of the Republic of Switzerland, residing at Arbon, in the Republic of Switzerland, have invented a new and useful Tilting Autotruck, of which the following is a specification.

My invention relates to improvements in tilting-autotrucks, the box of which can be manually turned through a convenient angle to either side by means of a hand-crank and suitable gearing; and my improvement consists in a locking device for the box, which device by means of a hand-lever brought into any of three positions can be so adjusted, that for the middle position of the hand-lever the box is prevented from motion, while for the extreme position of the hand-lever on one side the box is permitted to turn about an axis on this side, when the hand-crank is operated, and for the extreme position of the hand-lever on the other side the box is permitted to turn about an axis on this other side.

I will now proceed to describe my invention with reference to the accompanying drawings, in which—

Figure 11:
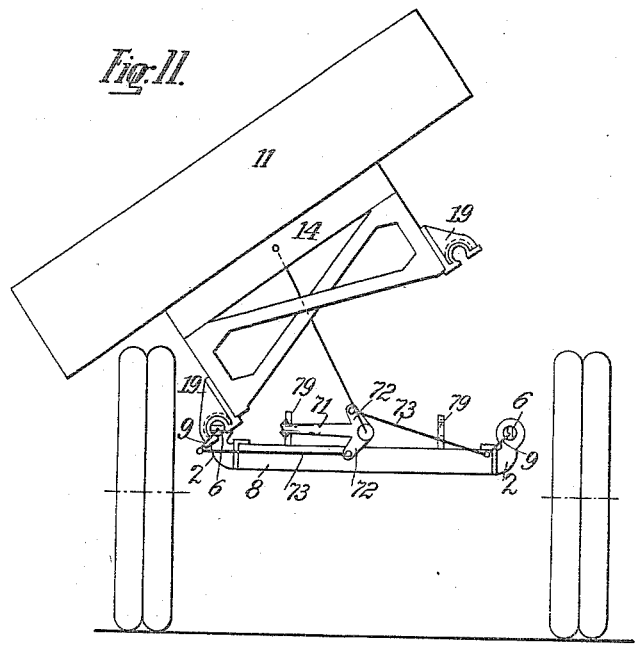
Figure 12:
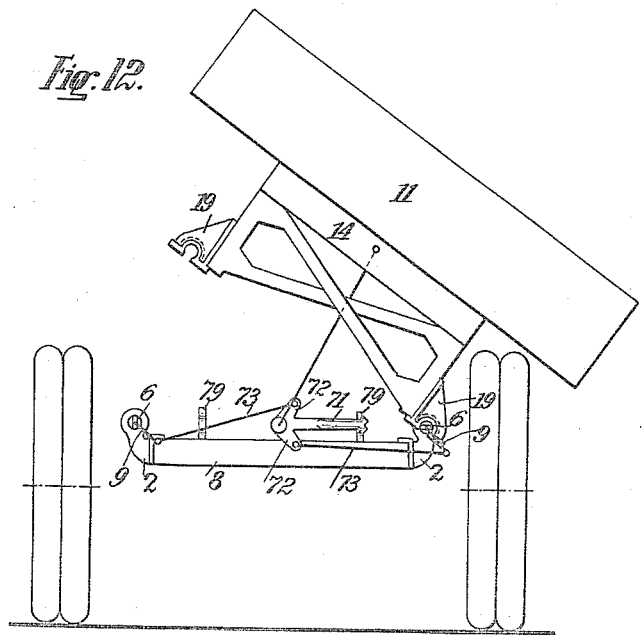

Figure 1 is an elevation of a tilting-autotruck embodying my invention, Fig. 2 is a rear end view of the same. Fig. 3 is a vertical cross section on an enlarged scale through the line A—B in Fig. 1, seen in the direction of the arrows. Fig. 4 is a similar section through the line C—D in Fig. 1. Fig. 5 is a vertical longitudinal section through the line E—F in Fig. 4, seen in the direction of the arrows. Fig. 6 is a vertical longitudinal section through the rear end of the autotruck on the line G—H in Fig. 2, seen in the direction of the arrows. Fig. 7 is an elevation of the upper end of a hand-lever shown in Fig. 6. Fig. 8 is a vertical cross section on an enlarged scale through the line I—J in Fig. 1, seen in the direction of the arrows. Fig. 9 is a vertical longitudinal section through the line K—L in Fig. 8, seen in the direction of the arrows, and Figs. 10 to 12 diagrammatically illustrate the three different positions of the tilting box.

Similar characters of reference refer to similar parts throughout the several views.

On each longitudinal side bar 1 of the car frame are fastened two supports 2, 2 (Figs. 1 to 4), which are shown as provided with a globular pivot 3 above. The two globular pivots 3, 3 on either side of the autotruck are horizontally bored and in these bores 4, 4 two thickened parts 5, 5 of a common shaft 6 are mounted to rock. The rear end of the shaft 6 also rocks in a bracket 7 fastened on the rear cross bar 8 of the car frame and carries an arm 9. The shaft 6 is prevented from longitudinally shifting by means of the arm 9 and a collar 10 (Fig. 1) bearing from both sides against the bracket 7.

Above the car frame is disposed a box 11 of any known construction, which I do not further describe here, as it is immaterial to my invention. The box 11 extends to the driver's seat 12 and is supported by a metallic frame comprising two longitudinal side bars 13, 13, two cross bars 14 at the front and rear, two intermediate pairs of cross bars 15, 15 (Figs. 8 and 9), four supports 16, 16 in the vertical cross central planes of the four globular pivots 3, 3 and suitable braces 17, 17 and 18, 18 for connecting the lower ends of the supports 16, 16 with the side bars 13, 13. At the lower end of each support 16 is fastened an open inverted globular bearing 19 (Figs. 3 to 5), which rests on the corresponding globular pivot 3 and also on the ends of the thickened part 5 of the shaft 6. This bearing 19 fits one half of the globular pivot 3 and slightly widens downward, as is clearly shown in Fig. 4. Each thickened part 5 of the shaft 6 is for the end portions projecting from the globular pivot 3 cut out on two opposite sides, so that the part 5 has at each end two parallel faces 20, 20 (Fig. 3) forming tangents to the shaft 6. Each bearing 19 is made to compass the two end portions of the part 5 projecting from the pivot 3 for the greater part of the periphery, a gap 21 being left between the two end faces 22, 22 (Figs. 3 and 5). This gap 21 has a width slightly larger than the diameter of the shaft 6. From an examination of Fig. 3 it will be evident, that when the faces 20, 20 of the parts 5 of the shaft 6 are horizontal, the two bearings 19, 19 on the respective side are prevented from moving upward, but when the shaft 6 has been turned through an angle of 90° and the faces 20, 20 are vertical, the projections $5^a$ $5^a$ (Fig. 3) left on the shaft 6 can pass through the gaps 21, in other words, the two bearings 19, 19 can be moved upward. The box 11 is to be tilted to either side by means of two telescopic screw-jacks, the construction of which is for example shown at Figs. 8 and 9.

On a pair of intermediate cross bars 23, 23 of the car frame are fastened two parallel beams 24, 24, which in their middle carry two bearings 25, 25 for the pivots 26, 26 of a frame. This frame is composed of two longitudinal sides 27, 27 and two cross sides 28, 28 conveniently bolted together. The cross sides 28, 28 form bearings for two hollow trunnions 29, 29 of a two-part casing 30, which is for the lower part globular and for the upper part substantially cylindrical. For the rear screw-jack two opposite short shafts 31, 31 are mounted to turn in the two hollow trunnions 29, 29 and carry within the casing 30 two opposite bevel wheels 32, 32 meshing with a third bevel wheel 33, the long nave 34 of which turns in the cylindrical part of the casing 30. Preferably a ball-bearing 35 is inserted between the upper end face of the casing 30 and a nut 36 fastened on the upper end of the nave 34. The long nave 34 has on its inside for the greater part of its length a square thread, in which a hollow screw-spindle 37 engages. This hollow screw-spindle in turn has also on its inside for the greater part of its length a square thread, in which a solid screw-spindle 38 engages. At the upper end the screw-spindle 38 has a collar 39 (Fig. 8) and a globular pivot 40. The collar 39 is adapted to normally bear against the upper end faces of the nave 34 and the hollow screw-spindle 37, as is shown. The globular pivot 40 is mounted to turn in all directions in a two-part bearing 41, which is secured between two of the intermediate cross bars 15, 15 above mentioned by means of two bolts 42, 42. The bearing 41 is made in one with a casing 43 provided at the lower end with a groove 44. The parts 41, 43 are made in halves, which permit the introduction of the pivot 40 and are connected together by means of a bolt 45 passing through a vertical slot 46 provided in the pivot. Lubricating material may be introduced from a lubricator 47 through a tube 48 to the pivot 40. Preferably the collar 39 is recessed for collecting the lubricating material flowing down from the pivot 40 and is provided with suitable holes for admitting the lubricating material to the two concentric threads below. Also to the long nave 34 lubricating material may be introduced from a lubricator 49 through a tube 50 and channels 51. The ball-bearing 35 may be surrounded by a protecting tube 52. As already mentioned, the casing 30 is longitudinally divided into halves for facilitating the composition of the screw-jack and the two halves are connected together by means of suitable bolts 53, 53. The casing 30 is preferably provided with a collar 54 having a groove 55. An extensible folding bag or tube 56 (Fig. 9) from elastic airtight material (such as water-proof canvas or the like) preferably surrounds the casing 30 and is secured at the ends by means of metallic rings 57, 57 engaging in the two grooves 44 and 55 for protecting the threads from dust.

The solid screw-spindle 38 is at the lower end rigidly connected with a nut 58, which is guided in the lower smooth bore of the hollow screw-spindle 37 and is adapted to strike the lower end of the inner thread of this spindle 37, whereby this spindle is prevented from further turning. The lower end of the hollow screw spindle 37 has a collar 59, which is adapted to strike the lower end of the thread of the long nave 34, whereby this nave and therewith the bevel wheel 33 is prevented from further turning.

The two already mentioned shafts 31, 31 have without the hollow trunnions 29, 29 two heads 60, 60 with a square cavity. Into this cavity of the rear head 60 (for the rear telescopic screw-jack) engages a square 61 at the front end of a shaft 62, the rear end of which is mounted to turn in a tubular bearing 63 (Fig. 6) and carries a hand-crank 64. The shaft 62 is prevented from longitudinally shifting in the bearing 63 by means of the nave of the hand-crank 64 and a collar 65 on the shaft. The bearing 63 has a globular collar 66 adapted to turn about a horizontal cross axis in a suitable support 67 fastened on the rear cross bar 8 of the car frame. Two opposite screws 68 in the support 67 engage with their ends in suitable recesses in the globular collar 66 and prevent the bearing 63 from longitudinal motion.

From the above explanations it will be obvious, that the frame 27, 28 turning about the pivots 26, 26 and the casing 30 turning about the hollow trunnions 29, 29 form a universal joint for freeing the telescopic screw-jack from all objectionable influences of any distortion of the car frame or displacement of the box 11 relatively to the car frame. For similar reasons the square 61 of the rear shaft 62 is a little rounded in the longitudinal direction, as is shown in Fig. 9, so that the shaft 62 is enabled to easily drive the bevel wheels 32, 33, 32 for any position of the telescopic screw-jack on the hand-crank 64 being turned.

In the head 60 of the front shaft 31 of the rear screw-jack engages a square 69 (similar to 61) of another shaft 70, which by means of a similar square at the front end engages in the head 60 of the respective shaft 31 of the front telescopic screw-jack. The latter of course differs from the rear screw-jack in that the front bevel wheel 32 and the front shaft 31 are omitted, while the front hollow trunnion 29 may be closed with a disk. The rear part of the bearing 63 (Fig. 6) is slightly reduced in diameter and loose on it is a hand-lever 71 made in one with two inclined arms 72, 72, which are pivotally connected with the two above mentioned arms 9, 9 by means of two adjustable rods 73, 73. The hand-lever 71 is at the free end provided with a central recess 74 and two lateral projections 75, 75 having two oppositely inclined faces 76, 76. A leaf spring 77 is fastened on the rear cross bar 14 beneath the box 11 and is made in one with a cylindrical lock 78, which is adapted to strike either inclined face 76 and to ride over the same, until it engages in the recess 74, as shown in Fig. 7. Thus the hand-lever 71 is yieldingly held in its middle vertical position. Two bent leaf springs 79, 79 (see Fig. 6) are fastened on the rear cross bar 8 of the car frame and are so shaped as to be capable of respectively holding the hand-lever 71 in either horizontal position. The hand-lever 71 on being turned downward is adapted to strike and to press to the front the upper end of either spring 79 for engaging in its recess 80.

The tilting-autotruck described operates as follows: When the hand-lever 71 occupies its normal vertical position and consequently its two arms 72, 72 both occupy their upper position, the two arms 9, 9 on the two shafts 6, 6 will both occupy their normal position shown in Figs. 2 and 10. Then the faces 20, 20 on both shafts 6, 6 will be horizontal (Fig. 3), so that the projections 5ᵃ, 5ᵃ of the shafts 6, 6 will lock the four bearings 19, 19 and prevent the box 11 from motion. In consequence of this the hand-crank 64 can not be turned for simultaneously operating the two telescopic screw-jacks. When it is desired to tilt the box 11 to the left (Fig. 11), the hand-lever 71 is first pushed to the left, so as to press the lock 78 (Fig. 6) upward out of its recess 74, after which the hand-lever 71 is turned downward, so that it strikes the upper end and engages in the recess 80 of the left spring 79 and occupies the horizontal position, while its left arm 72 occupies the lower extreme position shown in Fig. 11. During this turn the left arm 72 will by means of the left rod 73 have turned the left arm 9 first through a small angle upward without, however, turning the faces 20, 20 of the left shaft into a vertical plane, and then back to the normal position. This means, that the two left bearings 19, 19 remain locked. The right arm 72, on the contrary, has been turned to the extreme left position, so that it will by means of the right rod 73 have turned the right arm 9 to the left extreme position shown in Fig. 11, whereby the faces 20, 20 of the right shaft 6 are turned into a vertical plane, so that the two right bearings 19, 19 are set at liberty to move upward. Then the hand-crank 64 is turned in the respective direction, so that in the two telescopic screw-jacks the bevel wheels 33 may cause the inner screw-spindles 38 or the outer screw-spindles 37 to ascend, whereby the box 11 is gradually turned to the left, while the casings 43 moving with the box 11 out of reach of the nuts 36 permit the casings 30 with the nuts 36 and the upper ends of the naves 34 to move out of the axes of the casings 43 and to approach the inside of the protecting tubes 56 without, however, coming in contact with the same. After either of the two screw-spindles 37 or 38 has finished its stroke, the other will commence its stroke, so that at the end of the second stroke the two screw-spindles will have displaced themselves with regard to one another and to the nave 34 of the bevel wheel 33 and the box 11 will occupy its extreme position, when it will already have discharged its load. For the said extreme position the box 11 may make an angle of say 35° with the horizontal, which is sufficient to cause sand, rubble and the like to slide off the bottom of the box. When it is desired to tilt the box 11 to the right (Fig. 12), the hand-lever 71 is first turned to the right, so that the two right bearings 19, 19 remain locked, while the two left bearings 19, 19 are released, whereupon the hand-crank 64 is turned for simultaneously operating the two telescopic screw-jacks.

The tilting-autotruck can be varied without departing from the spirit of my invention.

I claim:

1. In a vehicle, a car frame, a tilting box turnable about either longitudinal side of said car frame, a hand-lever, means for yieldingly holding said hand-lever in three different positions, means on both sides of said car frame for locking and releasing said tilting box, transmissions from said hand lever to said means, and a device for turning said tilting box.

2. In a vehicle, a car frame having pivotal means on both longitudinal sides, a tilting box turnable about the pivotal means on either longitudinal side of said car frame, means on both sides of said car frame for locking and releasing said tilting box, a hand-lever, transmissions from said hand-lever to said means, screw-jacks, means for pivotally connecting said screw-jacks at the lower end with said car frame and at the upper end with said tilting box, and means for operating said screw-jacks so as to turn said tilting box in either direction.

3. In a vehicle, a car frame, four supports, two on each longitudinal side of said car frame, a tilting box, four bearings on said tilting box open below and normally bearing on said four supports and capable of turning on the two supports on either side of said car frame while moving upward from the two supports on the other side, means for preventing said four bearings from upward motion and for releasing them, a hand-lever, transmissions from said hand-lever to said means, and a device for turning said tilting box.

4. In a vehicle, a car frame, four supports with a globular pivot above, two on each longitudinal side of said car frame, a tilting box, four bearings on said tilting box normally bearing on the globular pivots of said four supports and capable of turning on the two globular pivots on either side of said car frame while moving upward from the two globular pivots on the other side, means for preventing said four bearings from upward motion and for releasing them, a hand-lever, transmissions from said hand-lever to said means, and a device for turning said tilting box.

5. In a vehicle, a car frame, a tilting box turnable about one longitudinal side of said car frame, a support with a globular pivot above on the other side of said car frame, the globular pivot having a horizontal bore, a shaft mounted to turn in the bore of said globular pivot and being without said globular pivot so cut out on two opposite sides as to present two pairs of opposite parallel faces, a bearing on said tilting box fitting the upper half of said globular pivot and compassing said shaft on both sides of said globular pivot for the greater part of the periphery while leaving gaps of a width equal to the distance apart of the opposite parallel faces of said shaft, and means for turning said shaft through an angle in either direction so as to lock and unlock said bearing.

GUSTAV SCHLATTER.

Witnesses:
GUSTAV A. MUNIER,
EUGENE NABEL.